United States Patent
Vaske et al.

[11] Patent Number: 5,978,042
[45] Date of Patent: Nov. 2, 1999

[54] DISPLAY DEVICE

[75] Inventors: Bernardus H. M. Vaske; Joanne H. D. M. Westerink, both of Eindhoven; Michiel J. van der Korst, Huizen; Guy J. Roberts, Eindhoven, all of Netherlands

[73] Assignee: U.S. Philips Corporation, New York, N.Y.

[21] Appl. No.: 09/120,619

[22] Filed: Jul. 22, 1998

[30] Foreign Application Priority Data

Jul. 26, 1997 [EP] European Pat. Off. ............. 97202359

[51] Int. Cl.⁶ .................................................. H04N 5/445
[52] U.S. Cl. ........................ 348/565; 348/569; 348/571
[58] Field of Search .................................. 348/565, 567, 348/568, 602, 673, 678, 687

[56] References Cited

U.S. PATENT DOCUMENTS

| | | | |
|---|---|---|---|
| 4,774,582 | 9/1988 | Hakamada et al. | 348/565 |
| 5,247,358 | 9/1993 | Richards | 348/191 |
| 5,416,534 | 5/1995 | Hayashi et al. | 348/687 |
| 5,852,474 | 12/1998 | Nakagaki et al. | 348/564 |

FOREIGN PATENT DOCUMENTS

| | | |
|---|---|---|
| 0773676A2 | 5/1997 | European Pat. Off. . |
| WO9844726 | 10/1998 | WIPO . |

*Primary Examiner*—Andrew I. Faile
*Assistant Examiner*—Sam Huang
*Attorney, Agent, or Firm*—Edward W. Goodman

[57] ABSTRACT

In a display device equipped with a picture-in-picture function, during controlling of the picture parameters of the main picture, one or several auxiliary pictures are presented on the screen, each having a certain combination of parameter settings. These may be preprogrammed, defined by a user, or automatically determined. The display device is provided with circuitry for transferring the parameter settings of one of the auxiliary pictures to the main picture. In a special embodiment, an auxiliary picture represents the parameter settings at the start of the picture parameter adjustment process. As a result, the old parameter settings may be compared with the new ones and, if so desired, may be reinstated in a simple manner.

10 Claims, 1 Drawing Sheet

DISPLAY DEVICE

BACKGROUND OF THE INVENTION

1. Field of the Invention

The invention relates to a display device comprising:

a picture screen, display means for imaging a main picture and at least one auxiliary picture on the picture screen such that picture properties of the main picture and of the auxiliary picture are determined by respective controllable picture parameters, and control means for controlling the picture parameter of the main picture.

The invention also relates to a method of controlling a picture parameter of a main picture.

2. Description of the Related Art

Such a display device is known from U.S. Pat. No. 5,247,358. The known display device comprises means for imaging an auxiliary picture over part of a main picture. Certain picture parameters can be adjusted in a simple manner by means of the auxiliary picture. The correctness of a certain setting of such a picture parameter is indicated by means of the visibility or invisibility of certain elements in the auxiliary picture, given certain ambient factors.

SUMMARY OF THE INVENTION

It is an object of the invention to provide an alternative method of adapting picture parameters. According to the invention, the device is, for this purpose, characterized in that the display device in addition comprises:

a memory for storing a parameter value of the picture parameter, and generating means for generating the auxiliary picture with substantially the same picture contents as at least part of the main picture, while the parameter value of the picture parameter of the auxiliary picture is identical to the parameter value stored in the memory, wherein the control means are designed for causing the display means to image the auxiliary picture on the picture screen, and wherein the control means in addition comprise copying means for rendering the parameter value of the picture parameter of the main picture equal to the parameter value of the picture parameter of the auxiliary picture when a given, predetermined operational action is carried out.

As a result of these measures, an auxiliary picture is visible with the same picture contents as at least part of the main picture, but with a constant setting of the picture parameters, during the process of adapting the picture parameters.

This setting may be, for example, preprogrammed by the manufacturer, or it may be automatically determined on the basis of ambient factors prevalent at the relevant moment. A user can render the parameter settings of the main picture equal to the parameter settings of the auxiliary picture by means of said operational action. The invention achieves that the effect of the adaptation thus obtained is visible beforehand in the auxiliary picture.

An embodiment of the display device according to the invention is characterized in that the control means in addition comprise further copying means for copying the parameter value of the picture parameter of the main picture into the memory when a further predetermined operational action is carried out.

The parameter settings, which are valid for the auxiliary picture, here assume the values of parameter settings of the main picture at the start of a series of parameter adaptations. This offers a user the possibility of neutralizing parameter adaptations in a simple manner at a later moment in that the parameter settings of the main picture are equalized to the parameter settings of the auxiliary picture again.

A further embodiment of the display device according to the invention is characterized in that the display device comprises further memories for storing a parameter value of the picture parameter, while the generating means is, in addition, designed for generating an auxiliary picture for each memory with substantially the same picture contents as at least part of the main picture, the parameter value of the picture parameter of the auxiliary picture being equal to the parameter value stored in the corresponding memory, and the control means is designed for causing the display means to display the auxiliary pictures on the picture screen, and in that the control means in addition comprise further copying means for rendering the parameter value of the picture parameter of the main picture equal to the parameter value of the picture parameter of a selected auxiliary picture.

In this embodiment, several auxiliary pictures are displayed, each with a certain group of parameter settings. These may be, for example, preprogrammed by the manufacturer, defined by a user, or automatically determined on the basis of ambient factors prevalent at the relevant moment. Through a selection of one of the auxiliary pictures, the parameter settings for the main picture are rendered equal to the parameter settings valid for the selected auxiliary picture.

The effect of the adaptation thus obtained can be viewed beforehand in the selected auxiliary picture.

The method according to the invention is characterized in that the method comprises the steps of:

displaying an auxiliary picture which has substantially the same contents as at least part of the main picture, the parameter value of the picture parameter of the auxiliary picture being read from a memory, and rendering the parameter value of the picture parameter of the main picture equal to the parameter value of the picture parameter of the auxiliary picture when a predetermined first condition arises.

BRIEF DESCRIPTION OF THE DRAWING

These and other aspects of the invention will be explained in more detail with reference to the accompanying drawing in which.

DESCRIPTION OF THE PREFERRED EMBODIMENTS

Figure 1:
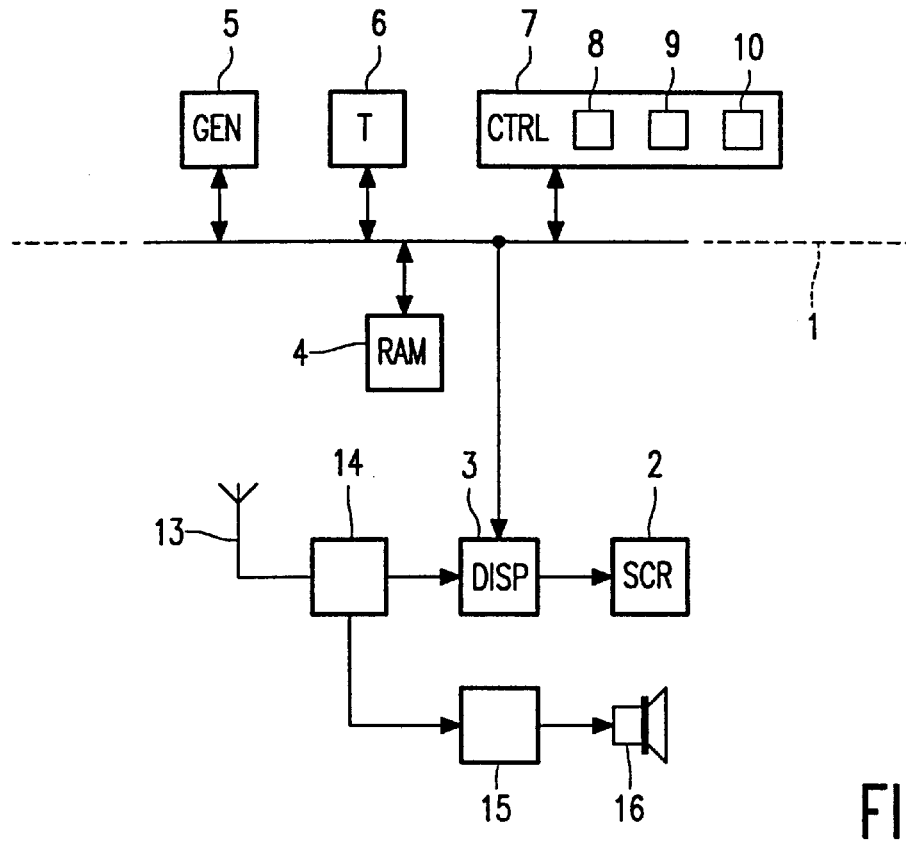
FIG. 1 shows a diagram of a television receiver comprising an embodiment of a display device according to the invention.

The television receiver shown in FIG. 1 comprises an antenna 13 which is capable of supplying a television signal to a tuner 14. The tuner 14 is capable of supplying an audio signal to an audio processor 15 which can make the audio signal audible via a loudspeaker 16. The tuner 14 is also capable of supplying a video signal to display means 3 which can render the video signal visible by means of a picture screen 2. The television receiver further comprises a data bus 1 which is designed for the exchange of information between the various further components. The following are connected to the data bus 1:

the display means 3,
a memory 4,
generating means 5,
a timer 6, and
control means 7 which comprise first copying means 8, second copying means 9, and a reset button 10.

The display means 3 is designed for displaying a full-screen main picture, a second picture serving as a picture-in-picture (PIP, see, for example, U.S. Pat. No. 5,438,372), and graphical information on the picture screen 2. Picture parameters of the main picture can be adjusted with the control means 7. The control means 7 is, for this purpose, equipped with control members by means of which a user can cause the display means 3 to present graphical auxiliary information on the picture screen 2, such as, menus and level indicators, and with which the user can select menu options, which is a known procedure. In an alternative embodiment, a separate control member is available for each picture parameter, for example, constructed as an up/down button pair. Any other known operating method may also be used.

At the start of a first parameter adaptation, the parameter values of the picture parameters valid for the main picture at that moment are stored in the memory 4 by the second copying means 9, and an auxiliary picture is generated by the generating means 5 and displayed on the picture screen 2 as a PIP by the display means 3. The picture contents of the auxiliary picture are equal to the picture contents of the main picture. The picture parameters of the auxiliary picture are determined by the parameter values stored in the memory 4.

The auxiliary picture remains visible until the graphical auxiliary information is removed from the picture screen 2 by means of a predetermined operational action, or until a time interval has elapsed since the latest parameter adaptation as measured by the timer 6.

While the picture parameters are being adjusted, the main picture can be continually compared with the auxiliary picture, and, accordingly, with the picture setting at the start of the picture parameter adaptation. If the user is not successful in obtaining a satisfactory setting of the picture parameters, the old parameter settings may be restored in a simple manner in that the parameter values of the picture parameters of the main picture are rendered equal to the parameter values of the picture parameters of the auxiliary picture by the first copying means 8. The copying means 8 can be activated by means of the reset button 10.

After the parameter values have thus been restored, the auxiliary picture and the graphical information disappear from the screen.

In an alternative embodiment, the auxiliary picture and the graphical information remain visible, and the parameter settings of the main picture and the auxiliary picture are interchanged. The user can call up the old and the new parameter settings alternately with the reset button 10, so that the two settings can be adequately compared with one another. When the graphical auxiliary information is removed from the picture screen 2 in the manner described, the parameter settings called up last are maintained.

In a further embodiment, the memory 4 does not contain the parameter values of the picture parameters at the start of a parameter adaptation, but instead the parameter values which were put in as standard values by the manufacturer of the television receiver.

Figure 2:
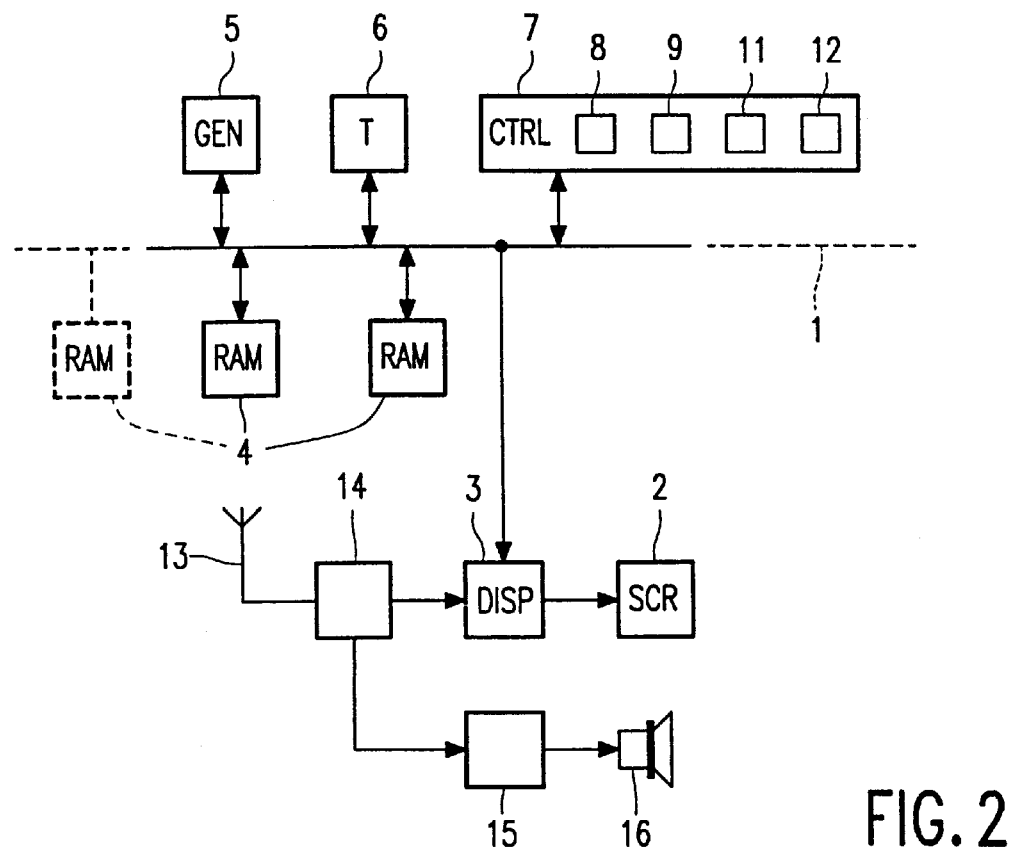
FIG. 2 is a diagram of a television receiver comprising a further embodiment of a display device according to the invention.

The television receiver shown in FIG. 2 comprises a further embodiment of a display device according to the invention. Compared with the display device shown in FIG. 1, the display device here comprises a number of further memories 4, and the control means 7 comprise third copying means 11 and selection means 12.

The reset button 10 is absent in this embodiment.

The memories 4 comprise combinations of parameter values which were put in as specimen settings by the manufacturer of the television receiver. At the start of a first parameter adaptation, auxiliary pictures are generated by the generating means 5 and displayed on the picture screen 2 as PIPs by the display means 3. The picture contents of the auxiliary pictures are identical to the contents of the main picture. The picture parameters of the auxiliary pictures are determined by the parameter values stored in the memories 4. A user can select one of the auxiliary pictures with the selection means 12, which will have the result that the parameter values of the picture parameters of the main picture are rendered equal to the parameter values of the picture parameters of the selected auxiliary picture by the third copying means 11. In a preferred embodiment, the selection means 12 comprise numerical keys, and the auxiliary pictures on the screen have been given unique numbers. Selection of an auxiliary picture takes place through pressing of a key number corresponding to that of the desired auxiliary picture.

Other known methods of selecting screen objects may also be used, for example, by means of a cursor controlled by a mouse.

The auxiliary pictures may be provided with short explanatory descriptions, for example referring to the most suitable ambient factors corresponding to the relevant parameter setting. A number of auxiliary pictures are visible on the picture screen 2 during the adjustment process owing to these measures, these auxiliary pictures represents suitable combinations of parameter settings for frequently occurring ambient factors. Selection of one of these auxiliary pictures causes the corresponding combination of parameter settings to be copied to the main picture. If so desired, an alternative embodiment may be used again where the parameter settings of the main picture and the selected auxiliary picture can be interchanged a number of times as desired.

In a further embodiment, the control means 7 comprise further copying means with which a user can copy the parameter values of the picture parameters of the main picture into one of the memories 4. It is possible, in this manner, to add a new specimen setting or to replace an existing one. It is also possible to add operational possibilities for changing the sequence of the specimen settings, for removing a specimen setting, and for putting in a description of a specimen setting.

The components and functions described may be implemented in various ways. The memories 4, for example, may be separate registers or may form part of a central memory bank. The various copying means are constructed by software means in a preferred embodiment. As was indicated above, the operational functions may be activated by means of special operational members, menu selections on the picture screen 2, or a combination of the two.

Summarizing, the invention relates to a display device which is fitted with a picture-in-picture function. One or several auxiliary pictures are presented on the screen, each comprising a certain combination of parameter settings, during the process of adapting the picture parameters of the main picture. These settings may be preprogrammed, defined by a user, or automatically determined. The display device is equipped with means for transferring the parameter settings of one of the auxiliary pictures to the main picture. In a special embodiment, an auxiliary picture represents the parameter settings at the start of the process of controlling the picture parameters. As a result of this, the old parameter settings can be compared with the new ones and, if so desired, can be restored in a simple manner.

What is claimed is:

1. A display device comprising:

a picture screen;

display means for imaging a main picture and at least one auxiliary picture on the picture screen such that picture properties of the main picture and of the auxiliary picture are determined by respective controllable picture parameters; and control means for controlling the controllable picture parameter of the main picture; characterized in that the display device in addition comprises:

a memory for storing a current parameter value of the controllable picture parameter of the main picture; and generating means for generating the auxiliary picture, the auxiliary picture having a picture content substantially the same as at least part of the main picture, a parameter value of the controllable picture parameter of the auxiliary picture being identical to the current parameter value of the controllable picture parameter of the main picture stored in the memory; wherein the control means causes the display means to image the auxiliary picture on the picture screen, and wherein the control means further comprises:

means for varying the parameter value of the controllable picture parameter of the auxiliary picture; and copying means for selectively changing the parameter value of the controllable picture parameter of the main picture from the current parameter value to a new parameter value equal to the parameter value of the controllable picture parameter of the auxiliary picture when a given, predetermined operational action is carried out.

2. A display device as claimed in claim 1, characterized in that the control means further comprises:

further copying means for copying the new parameter value of the controllable picture parameter of the main picture into the memory when a further predetermined operational action is carried out.

3. A display device as claimed in claim 1, characterized in that the control means further causes the display means to remove the auxiliary picture from the screen upon the occurrence of a further predetermined operational action.

4. A display device as claimed in claim 1, characterized in that the control means further causes the display means to display the auxiliary picture during a first time interval having a predetermined duration, the beginning of said first time interval coinciding with a first modification of the controllable picture parameter of the auxiliary picture, while the auxiliary picture, upon a subsequent modification of the controllable picture parameter of the auxiliary picture starting within the first time interval, remains visible during a second time interval having a duration substantially the same as the duration of the first time interval, the beginning of the second time interval coinciding with the subsequent modification of the controllable picture parameter of the auxiliary picture.

5. A display device as claimed in claim 1, characterized in that the display device comprises further memories for storing respective current parameter values of respective further controllable picture parameters of the main picture, while the generating means generates an auxiliary picture for each of said memory and said further memories, said auxiliary pictures having respective picture contents substantially the same as at least part of the main picture, a parameter value of a controllable picture parameter of each respective auxiliary picture being equal to the current parameter value of the controllable picture parameter of the main picture stored in the respective memory, the control means causing the display means to display the auxiliary pictures on the picture screen, wherein the control means further comprises:

means for varying the parameter value of the controllable picture parameter in each of said auxiliary pictures corresponding to said further memories; and further copying means for selectively changing the parameter values of the controllable picture parameters of the main picture from the current parameter values to respective new parameter values equal to the parameter values of the controllable picture parameters of selected ones of the auxiliary pictures.

6. A display device as claimed in claim 1, characterized in that the display means displays the main picture and the auxiliary picture in an at least partly overlapping manner.

7. A television receiver provided with a display device as claimed in claim 1.

8. A method of controlling a picture parameter of a main picture, characterized in that the method comprises the steps:

storing a current value of the picture parameter of the main picture in a memory;

displaying an auxiliary picture which has substantially the same picture content as at least part of the main picture, a parameter value of a picture parameter of the auxiliary picture corresponding to the current value of the picture parameter of the main Picture stored in the memory;

varying the parameter value of the picture parameter of the auxiliary picture; and selectively changing the parameter value of the picture parameter of the main picture from the current parameter value to a new parameter value equal to the varied parameter value of the picture parameter of the auxiliary picture when a predetermined operational action is carried out.

9. A method as claimed in claim 8, characterized in that the method further comprises the step:

changing the varied parameter value of the picture parameter of the auxiliary picture to a new parameter value equal to the current parameter value of the picture parameter of the main picture when a further predetermined operational action is carried out.

10. A method as claimed in claim 8, wherein said main picture has a plurality of further picture parameters, characterized in that the method further comprises the steps:

storing current parameter values of said plurality of further picture parameters in a respective plurality of further memories;

displaying a plurality of further auxiliary pictures which have substantially the same picture content as at least part of the main picture each time, a parameter value of a picture parameter of each further auxiliary picture corresponding to the current parameter value of the picture parameter of the main picture stored in a respective one of the further memories;

varying the parameter values of the picture parameters in selected ones of the plurality of further auxiliary pictures; and selectively changing the parameter values of the further picture parameters of the main picture from the current parameter values to new parameter values equal to the parameter values of the picture parameters of selected ones of the further auxiliary pictures when a further predetermined operational action is carried out.

* * * * *